United States Patent
Chang et al.

(10) Patent No.: US 7,137,315 B2
(45) Date of Patent: Nov. 21, 2006

(54) WHEEL HUB HAVING DRIVING MECHANISM

(76) Inventors: Chao Lang Chang, P.O. Box 63-298, Taichung (TW) 406; Meng Han Hsieh, P.O. Box. 63-298, Taichung (TW) 406

( * ) Notice: Subject to any disclaimer, the term of this patent is extended or adjusted under 35 U.S.C. 154(b) by 269 days.

(21) Appl. No.: 10/903,835

(22) Filed: Jul. 30, 2004

(65) Prior Publication Data

US 2006/0025268 A1    Feb. 2, 2006

(51) Int. Cl.
*B60K 7/00* (2006.01)

(52) U.S. Cl. .................... 74/730.1; 180/308

(58) Field of Classification Search ............. 74/655, 74/730.1; 180/308, 371; 301/6.5
See application file for complete search history.

(56) References Cited

U.S. PATENT DOCUMENTS

| 2,438,040 | A | * | 3/1948 | Duhaime ............... 74/730.1 |
| 2,598,876 | A | * | 6/1952 | Ash ..................... 74/730.1 |
| 3,477,547 | A | * | 11/1969 | Kress et al. ............ 180/308 |
| 4,213,514 | A | * | 7/1980 | Ehrlinger et al. ........ 180/308 |
| 4,275,616 | A | * | 6/1981 | Ehrlinger et al. ........ 180/308 |
| 4,546,844 | A | * | 10/1985 | Stauffer ................ 180/308 |
| 4,738,551 | A |   | 4/1988 | Chi .................... 384/519 |
| 4,930,590 | A | * | 6/1990 | Love et al. ............. 180/308 |
| 5,024,121 | A |   | 6/1991 | Hsieh .................. 74/594.1 |
| 6,186,262 | B1 | * | 2/2001 | Mann et al. ............ 180/308 |
| 6,736,099 | B1 |  | 5/2004 | Mori et al. ............ 123/179.31 |
| 2001/0035012 | A1 | * | 11/2001 | Smith ................... 475/83 |
| 2002/0125060 | A1 | * | 9/2002 | Cigal .................. 180/305 |

FOREIGN PATENT DOCUMENTS

DE        36 06 876     * 10/1987     ............. 180/371

* cited by examiner

*Primary Examiner*—Sherry Estremsky
(74) *Attorney, Agent, or Firm*—Charles E. Baxley

(57) ABSTRACT

A wheel hub for attaching to a vehicle includes a hydraulic engine received in a hub shell and attached or secured to the vehicle, for allowing the hub shell to be rotated relative to the hydraulic engine and the vehicle. The hydraulic engine includes a rotatable spindle, and a coupling device coupled between the spindle of the hydraulic engine and the hub shell, to allow the hub shell to be driven or rotated by the hydraulic engine. A plate and a casing are rotatably received in the hub shell, to rotatably support the hydraulic engine in the hub shell with the plate and the casing. A directional control device may be used to control rotational movements between the spindle of the hydraulic engine and the hub shell.

12 Claims, 16 Drawing Sheets

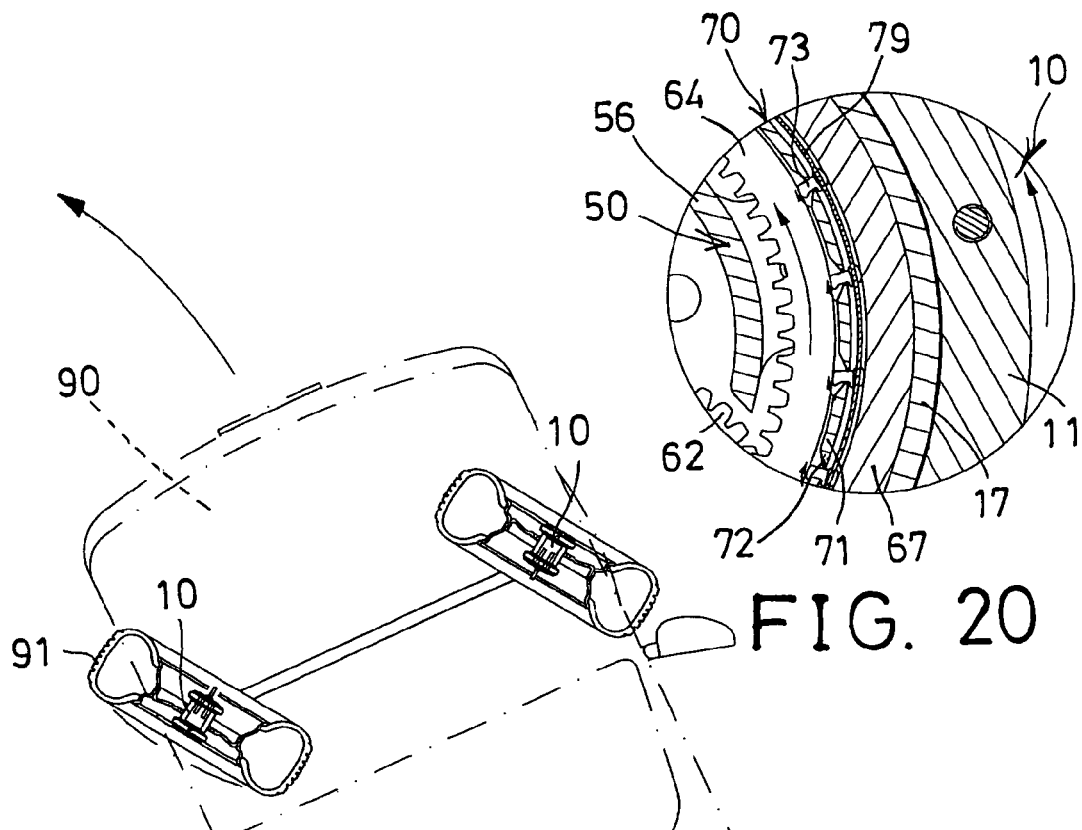
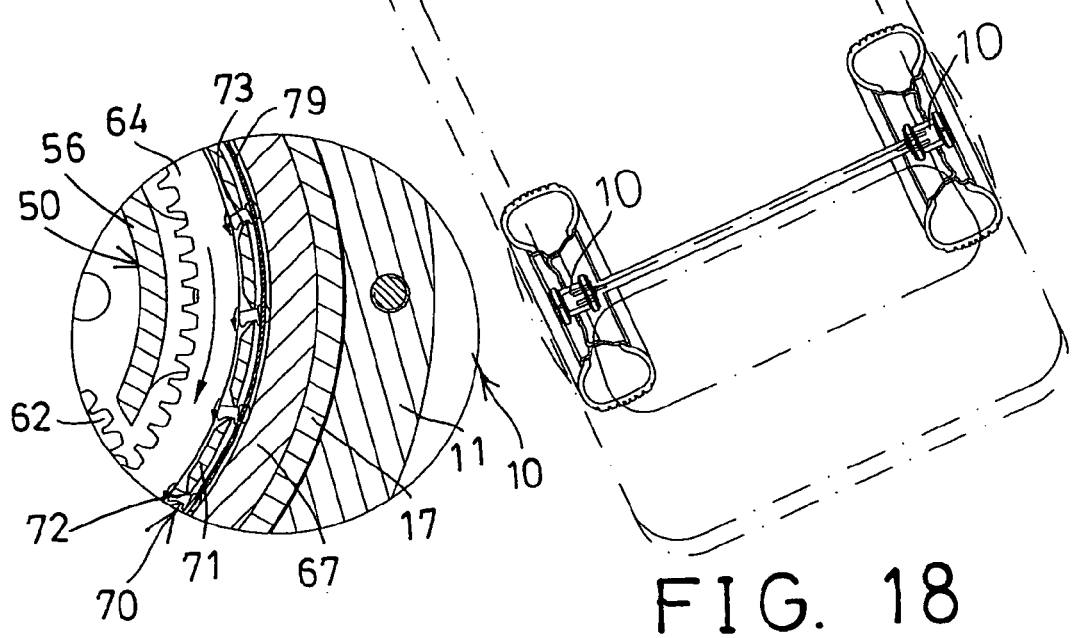
FIG. 18
FIG. 19
FIG. 20

WHEEL HUB HAVING DRIVING MECHANISM

BACKGROUND OF THE INVENTION

1. Field of the Invention

The present invention relates to a wheel hub, and more particularly to a wheel hub having a hydraulic driving mechanism for driving wheels of cycles or vehicles.

2. Description of the Prior Art

Typical wheel hubs comprise a wheel axle attached or secured to cycles or vehicles, and a hub shell rotatably attached onto the wheel axle, and secured to wheels of the cycles or vehicles, for rotatably coupling or attaching the wheels to the cycles or vehicles with the wheel axle.

For example, U.S. Pat. No. 4,738,551 to Chi, and U.S. Pat. No. 5,024,121 to Hsieh disclose two of the typical wheel hubs each also comprising a hub shell rotatably attached onto a wheel axle which is attached or secured to the cycles or vehicles, for rotatably coupling or attaching the wheels to the cycles or vehicles with the wheel axle.

However, the typical wheel hubs do not include any driving devices or mechanisms to drive or to rotate the wheels and the hub shells relative to the wheel axles. Normally, the typical wheel hubs include a unidirectional driving device or mechanism disposed therein to control the wheel to rotate relative to the cycle or vehicle in one direction only.

Typical motor cycles, vehicles, trains, trucks, etc. are rotated or driven by motors or engines. Recently, a hydraulic engine has been developed and attached to the motor cycles, the vehicles, the trains, the trucks, or the like, for driving the vehicles, instead of typical motors or engines. One example of the hydraulic engines has been disclosed in U.S. Pat. No. 6,736,099 to Mori et al.

However, the typical vehicles may not be driven without the typical motors or engines and the hydraulic engines, and both the typical motors or engines and the hydraulic engines may occupy a great volume of the vehicles.

The present invention has arisen to mitigate and/or obviate the afore-described disadvantages of the conventional wheel hubs for cycles or vehicles.

SUMMARY OF THE INVENTION

The primary objective of the present invention is to provide a wheel hub including a hydraulic driving mechanism for driving wheels of cycles or vehicles.

In accordance with one aspect of the invention, there is provided a wheel hub for attaching to a vehicle, the wheel hub comprising a hub shell including a chamber formed therein, a hydraulic engine received in the chamber of the hub shell, and for attaching to the vehicle, and for allowing the hub shell to be rotated relative to the hydraulic engine and the vehicle, and the hydraulic engine including a rotatable spindle extended therefrom, and a coupling device coupled between the spindle of the hydraulic engine and the hub shell, to allow the hub shell to be driven by the hydraulic engine.

The hub shell includes a plate and a casing rotatably received in the chamber thereof, and the hydraulic engine is attached between the plate and the casing, and thus to rotatably support the hub shell on the hydraulic engine and the plate and the casing.

One or more fasteners may further be provided to secure the plate and the casing together, to stably retain the hydraulic engine between the plate and the casing.

The casing includes a space formed therein to receive a first end of the hydraulic engine, and to anchor the hydraulic engine to the casing. The hydraulic engine includes at least one recess formed in the first end thereof, the casing includes at least one jut extended into the space thereof, and engaged into the recess of the hydraulic engine, to stably anchor the hydraulic engine to the casing.

The casing includes two openings formed therein, and the hydraulic engine includes two passages formed therein and aligned with the openings of the casing, for allowing hydraulic fluid to flow into and out of the hydraulic engine.

The coupling device includes a housing secured to the plate and having a chamber formed therein, an annular gear rotatably disposed around the housing, a pinion attached to the spindle, and a gearing engaged between the pinion and the annular gear, to allow the annular gear to be driven relative to the housing by the hydraulic engine via the gearing and the pinion.

The housing includes three notches formed therein, the gearing includes three gears rotatably secured to the housing and engaged with the pinion, and each having a second pinion provided thereon and partially extended out through the notches of the housing respectively, and engaged with the annular gear. The coupling device includes a directional control device disposed between the housing and the hub shell, to control rotational movements between the annular gear and the hub shell.

The hub shell includes an end cover secured thereto, a barrel attached to the end cover and rotated in concert with the end cover, the directional control device includes a ring member disposed between the annular gear and the barrel and having a number of apertures formed therein, and a number of pawls disposed through the apertures of the ring member and engaged between the annular gear and the barrel, to control the rotational movements between the annular gear and the hub shell.

The end cover includes a number of cavities formed therein, the barrel includes a number of extensions extended therefrom and engaged into the cavities of the end cover, to secure the barrel to the end cover.

The directional control device includes a retaining ring engaged with the pawls, to retain the pawls to the ring member. The pawls each includes a groove formed in outer portion thereof, to receive the retaining ring, and to retain the pawls to the ring member. The ring member includes a number pairs of inclined surfaces formed therein and arranged beside the apertures thereof respectively, for allowing the pawls to be tilted relative to the ring member.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 17, 18 are top plan views similar to FIG. 16, illustrating the vehicle having a wheel hub driving mechanism attached thereto; and FIGS. 19, 20 are enlarged partial cross sectional views illustrating the operation of the wheel hub driving mechanisms received in two different wheels that are spaced away from each other.

DETAILED DESCRIPTION OF THE PREFERRED EMBODIMENT

Figure 1:
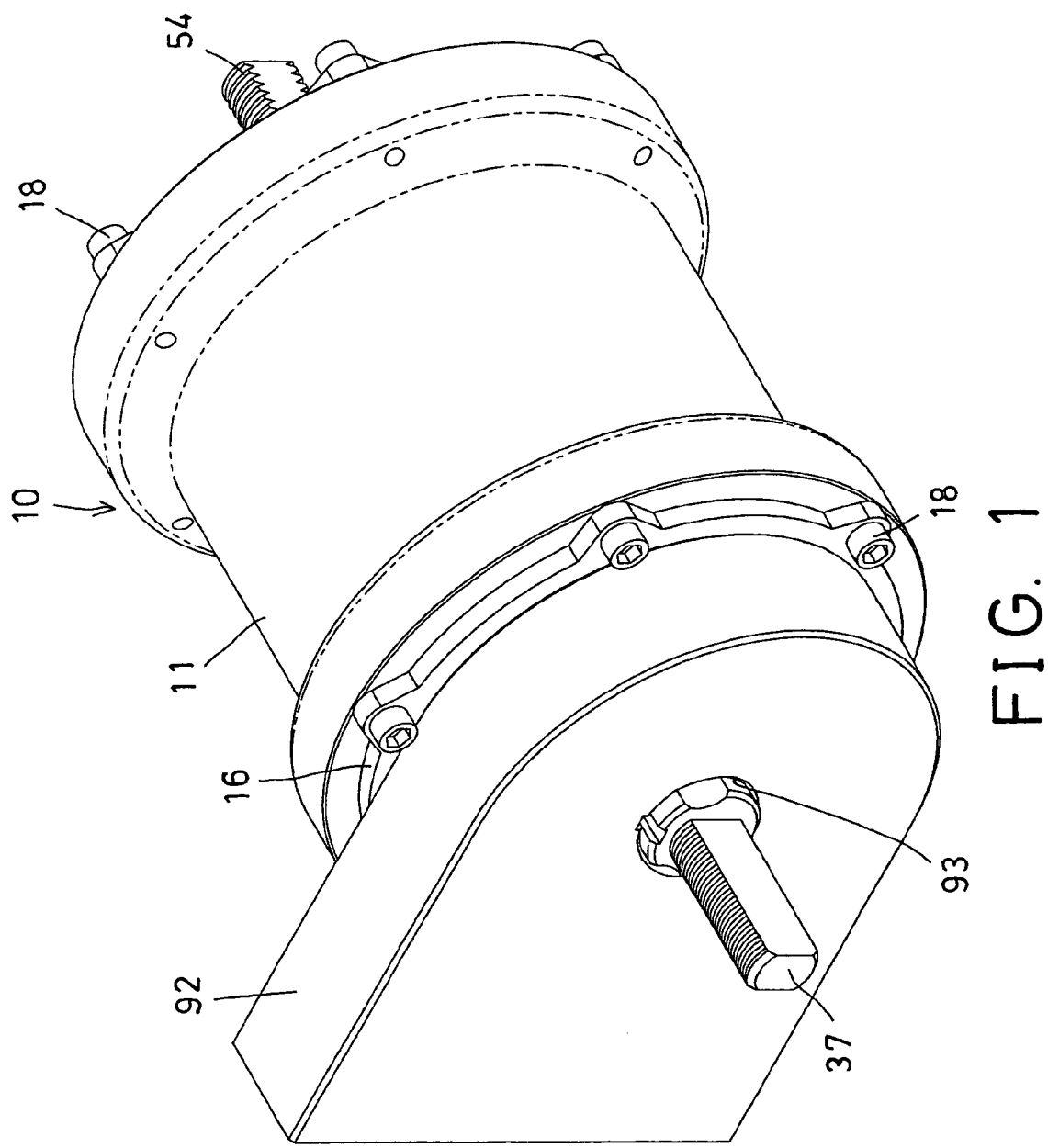
FIG. 1 is a partial perspective view of a wheel hub in accordance with the present invention.

Referring to the drawings, and initially to FIGS. 10–18, a wheel hub 10 in accordance with the present invention is provided for rotatably attaching a wheel 91 to a body 90 of a bicycle (FIG. 11), of a motor cycle (FIG. 12), an electric vehicle (FIG. 13), a bus (FIG. 14), a truck (FIG. 15), a scooter (FIG. 16), a vehicle (FIGS. 10, 17, 18), or the like, and comprises a hydraulic driving mechanism for rotating or driving the wheel 91 relative to the body 90 of the vehicle.

Figure 2:
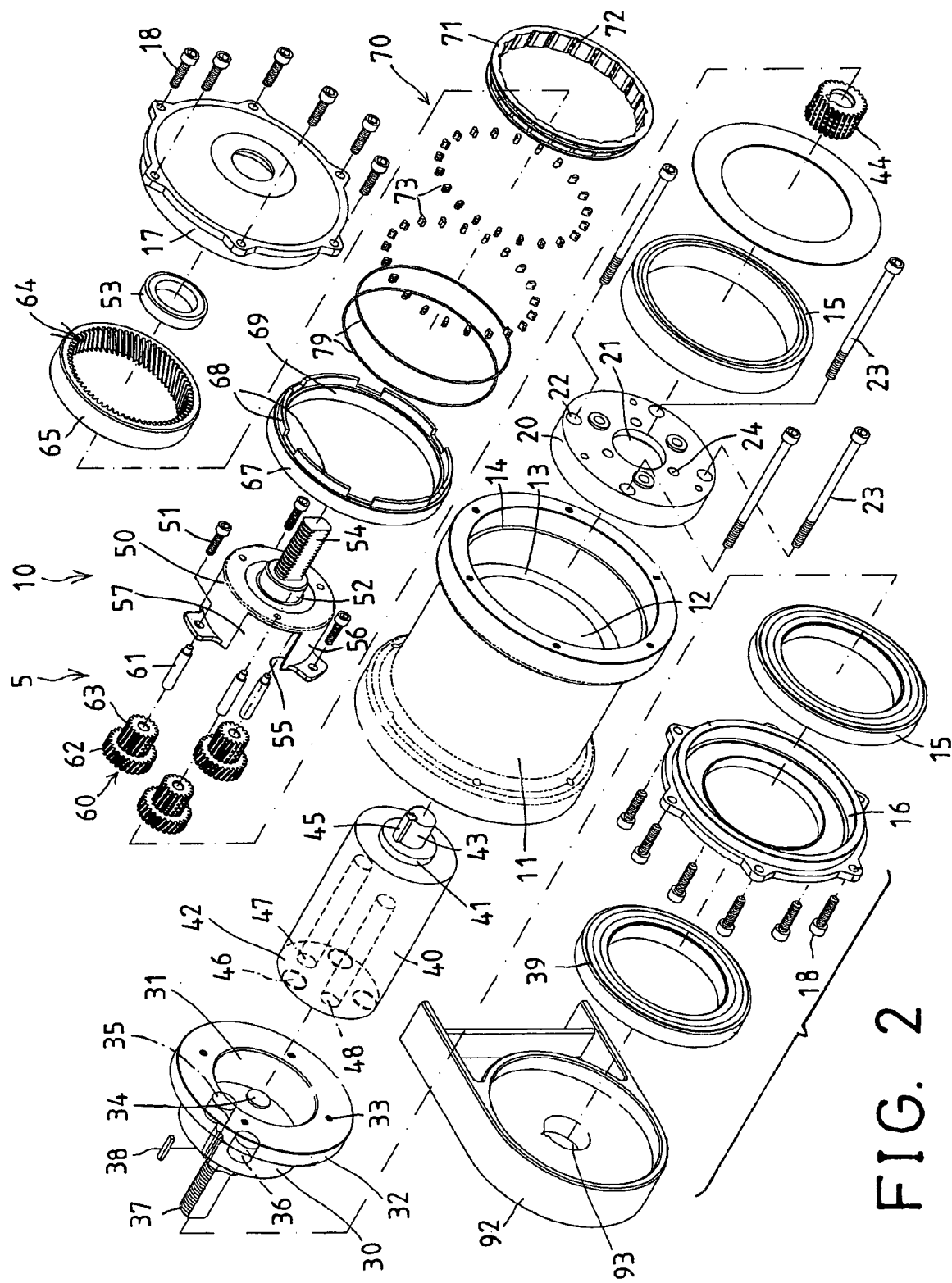
FIG. 2 is an exploded view of the wheel hub.
Figure 4:
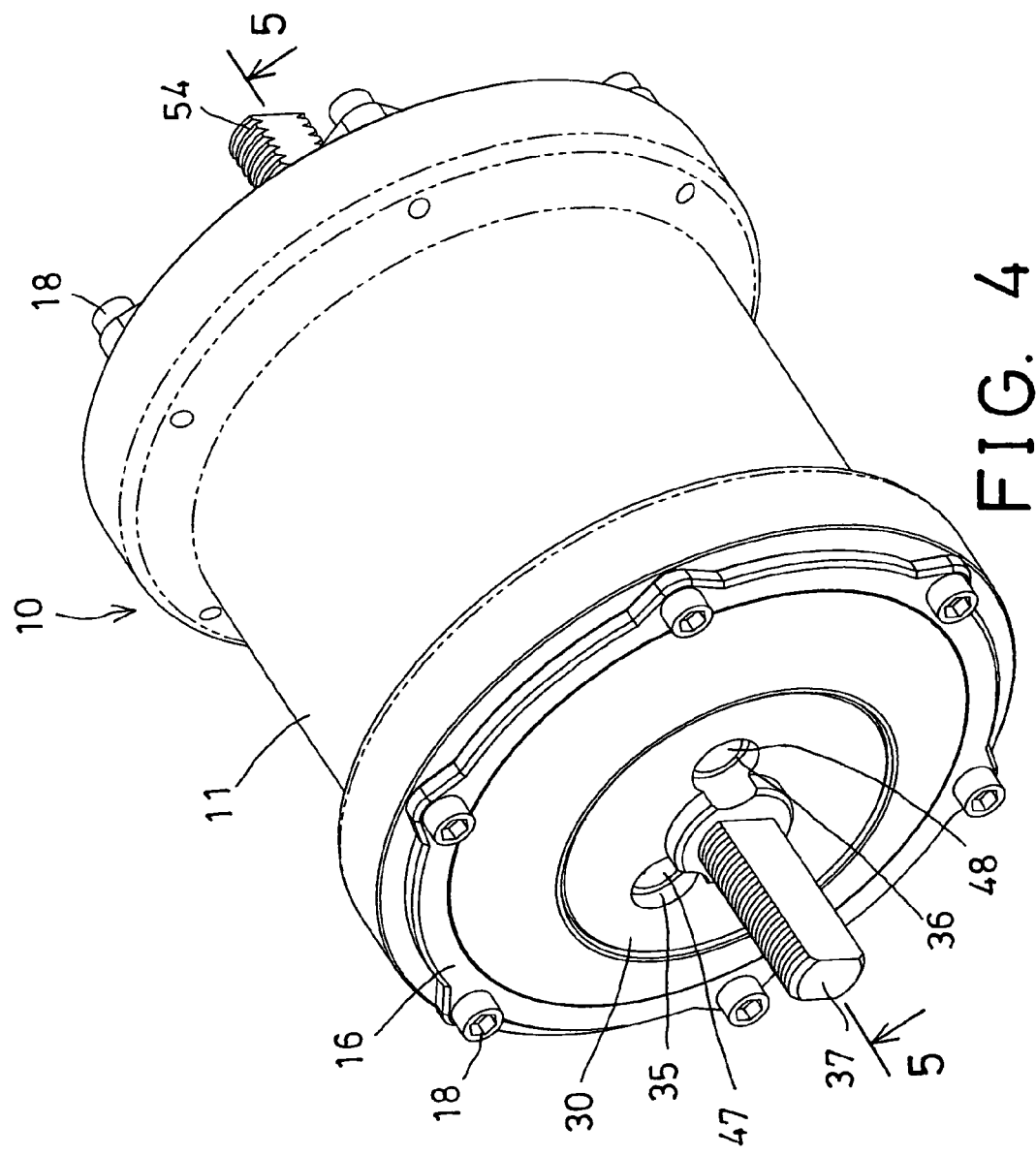
FIG. 4 is a perspective view similar to FIG. 1, in which a supporting member has been removed from the wheel hub.

For example, as shown in FIGS. 1 and 2, the wheel hub 10 may include a hub shell 11 attached or secured to the wheel 91 of the vehicle, and rotatably attached to a supporting member 92 of the body 90 of the vehicle, for allowing the hub shell 11 and thus the wheel 91 of the vehicle to be rotated relative to the supporting member 92 of the body 90 of the vehicle.

Figure 3:
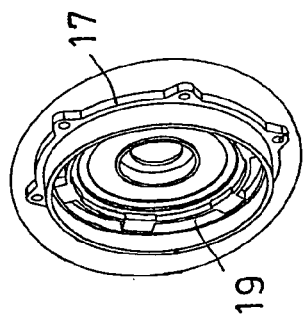
FIG. 3 is a perspective view illustrating an end cover of the wheel hub.
Figure 5:
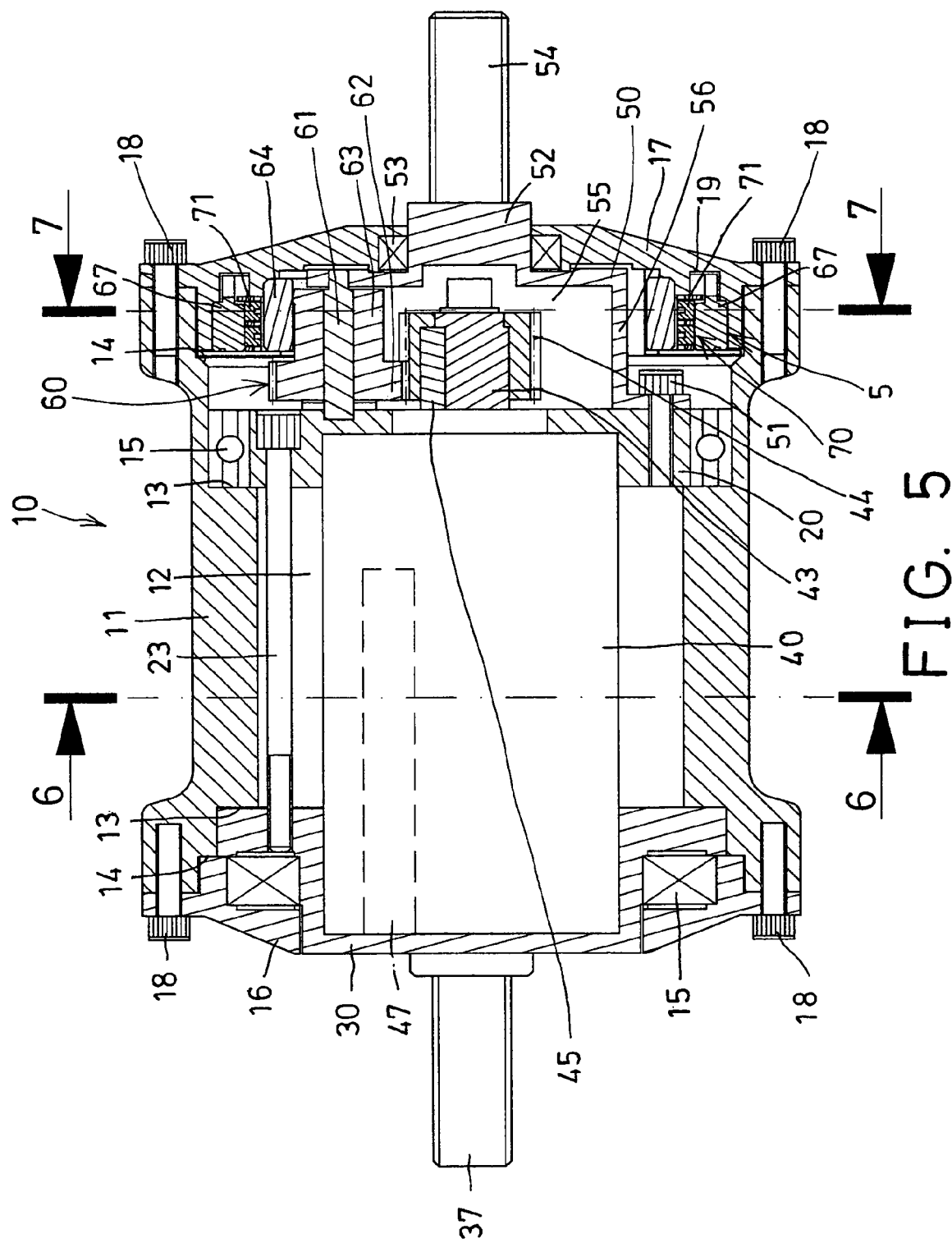
FIG. 5 is a cross sectional view of the wheel hub, taken along lines 5—5 of FIG. 4.
Figure 6:
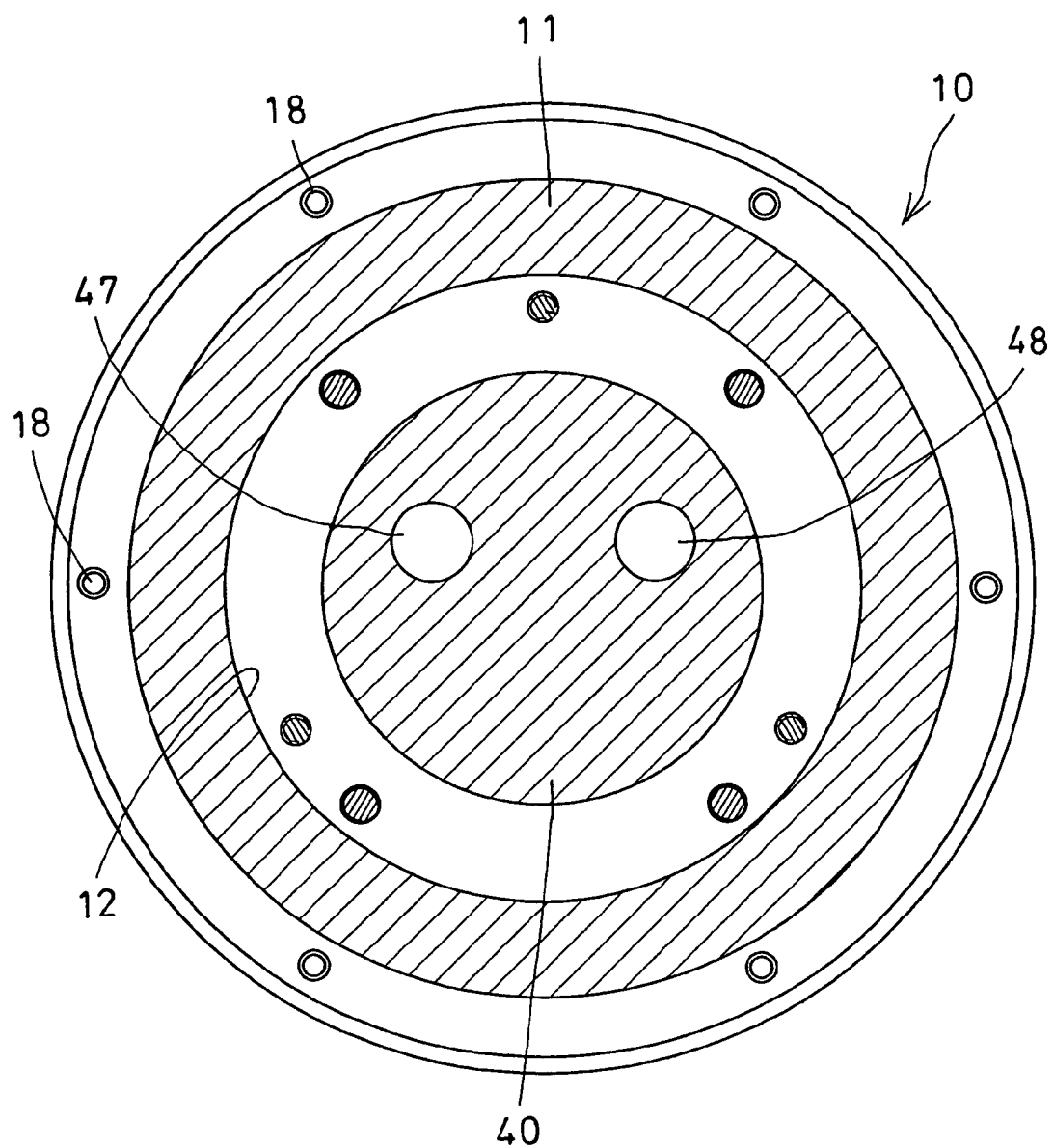
FIGS. 6, 7 are cross sectional views taken along lines 6—6 and 7—7 of FIG. 5 respectively.

As shown in FIGS. 2 and 4–7, the hub shell 11 includes a chamber 12 and one or more stepped holes or enlarged peripheral recesses 13, 14 formed therein for receiving bearings 15 therein, two end covers 16, 17 attached to the ends of the hub shell 11, and secured to the hub shell 11 with fasteners 18, to allow the hub shell 11 and the end covers 16, 17 and the wheels 91 to be rotated in concert with each other. One of the end covers 17 includes one or more cavities 19 formed therein (FIG. 3).

A plate 20 is rotatably received in the enlarged peripheral recess 13 at one end of the hub shell 11, and rotatably secured to the hub shell 11 with one of the bearings 15, to allow the plate 20 to be rotated relative to the hub shell 11. The plate 20 includes a central orifice 21 formed therein, and a number of holes 22 formed in the outer peripheral portion thereof for receiving fasteners 23, and a number of screw holes 24 formed in the inner peripheral portion thereof or arranged around the central orifice 21 thereof.

A casing 30 is rotatably received in the other end of the hub shell 11, and rotatably attached to the hub shell 11 or the end cover 16 with such as the other bearing 15 (FIG. 2), to allow the casing 30 to be rotated relative to the hub shell 11. The casing 30 includes a central space 31 formed therein, and a peripheral flange 32 radially extended therefrom and rotatably engaged in the enlarged peripheral recess 13 at the other end of the hub shell 11, and a number of screw holes 33 formed therein for threading with the fasteners 23, and for securing the casing 30 and the plate 20 together.

The casing 30 includes one or more juts 34 extended into the central space 31 thereof, and includes two openings 35, 36 formed therein, and includes a shaft 37 extended therefrom, and extended out through the end cover 16, and extended out through a central hole 93 of the supporting member 92 of the vehicle. The shaft 37 may be secured or keyed to the supporting member 92 with a key 38 or the like, to solidly secure the casing 30 to the supporting member 92, and to prevent the casing 30 from being rotated relative to the supporting member 92 of the body 90. The end cover 16 and the hub shell 11 may be rotatably secured to the supporting member 92 with one or more bearings 39 (FIG. 2).

A hydraulic engine 40 is received in the chamber 12 of the hub shell 11 and includes a protrusion 41 extended from one end thereof and engaged in the central orifice 21 of the plate 20, to attach or to anchor the hydraulic engine 40 to the plate 20, and includes the other end 42 engaged in the central space 31 of the casing 30, to allow the hydraulic engine 40 to be stably received and anchored and secured between the plate 20 and the casing 30. The hydraulic engine 40 includes a rotatable spindle 43 extended out through the central orifice 21 of the plate 20, and includes a pinion 44 secured to the spindle 43 with such as a key 45, to allow the pinion 44 to be rotated in concert with the spindle 43.

The hydraulic engine 40 includes one or more recesses 46 formed in the other end 42 thereof, to receive the juts 34 of the casing 30, and thus to further stably anchor and secure the hydraulic engine 40 to the casing 30, and to prevent the hydraulic engine 40 from being rotated relative to the casing 30. The hydraulic engine 40 further includes two passages 47, 48 formed in the other end 42 thereof, and aligned with the openings 35, 36 of the casing 30 (FIG. 4), for allowing hydraulic oil or fluid to flow into and out of the hydraulic engine 40.

Figure 10:
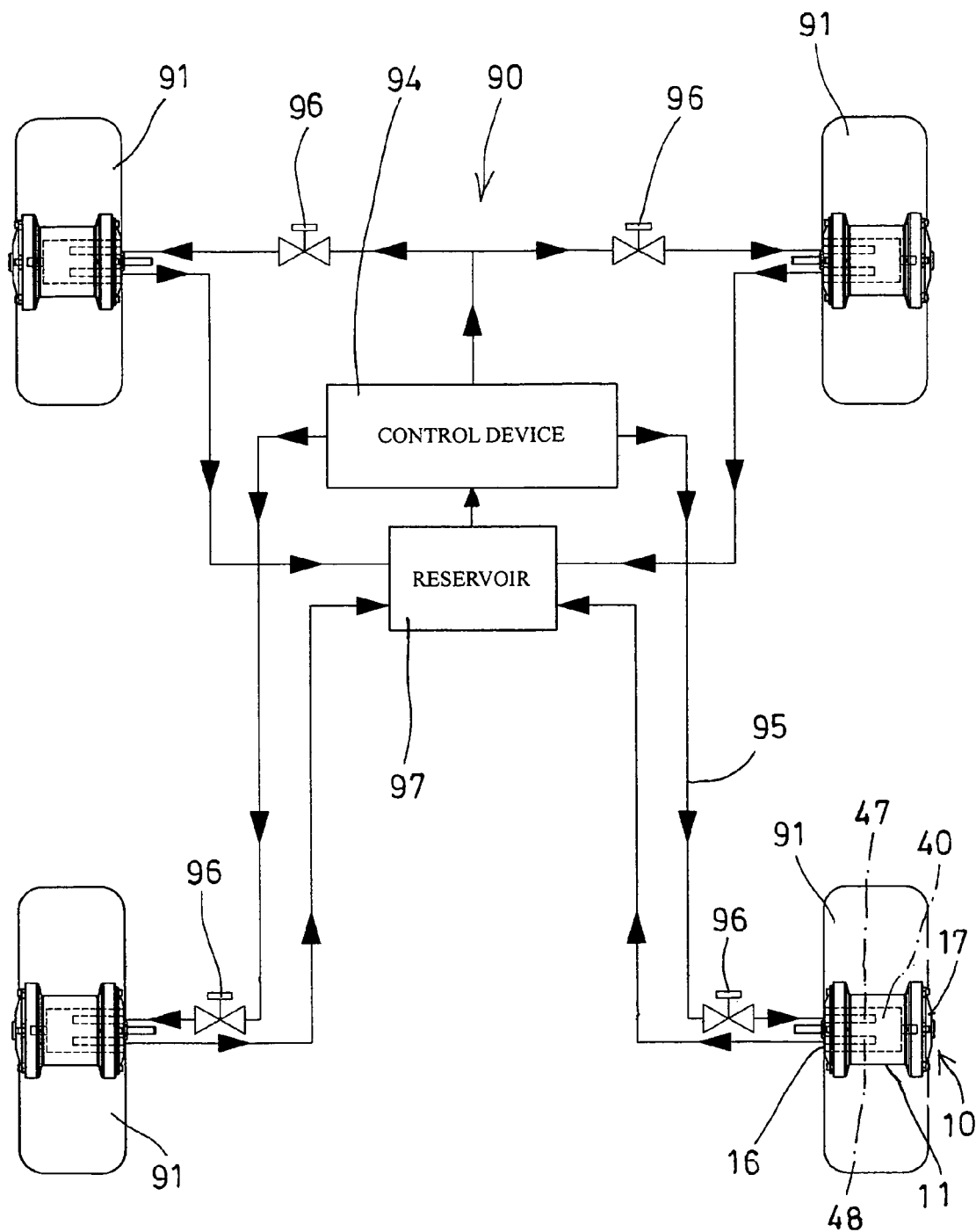
FIG. 10 is a block diagram illustrating the arrangement of the hydraulic tubing system for the wheel hub driving mechanism.
Figure 11:
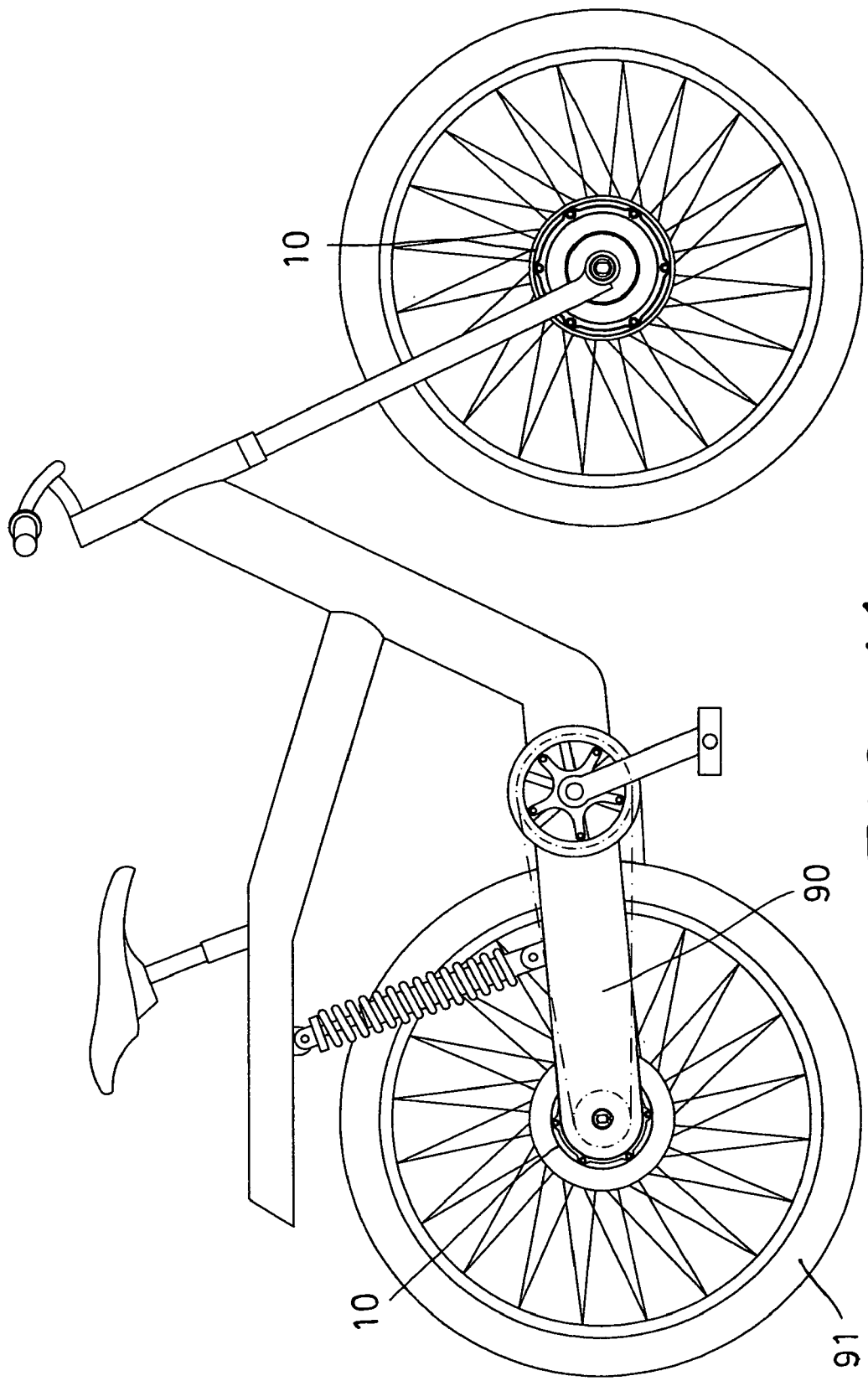
FIG. 11 is a plan view of a bicycle having a wheel hub driving mechanism attached thereto.
Figure 12:
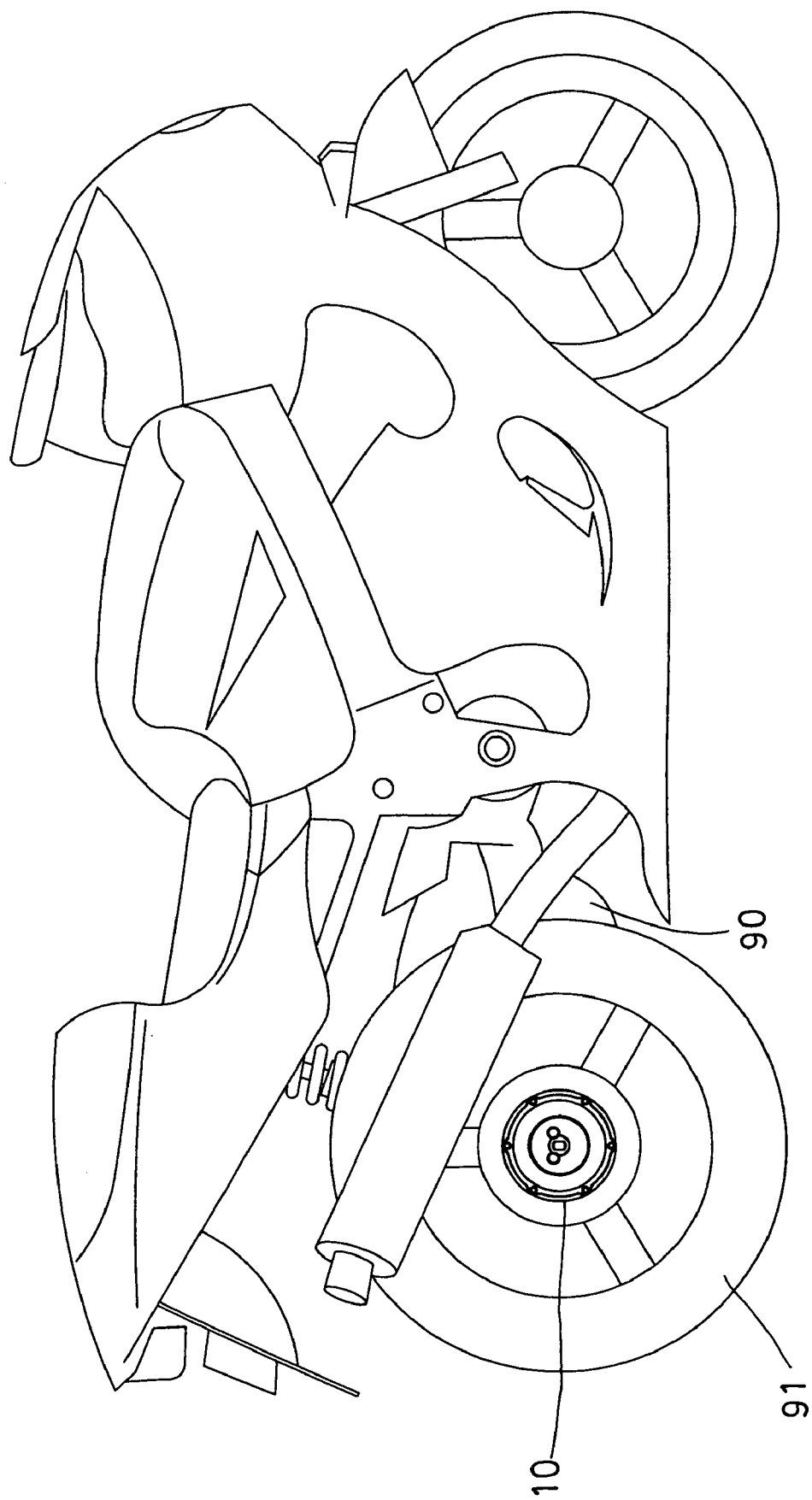
FIGS. 12, 13, 14, 15 are plan views similar to FIG. 11, illustrating the motor cycle, the electric vehicle, the bus, and the truck respectively, each also having a wheel hub driving mechanism attached thereto.
Figure 13:
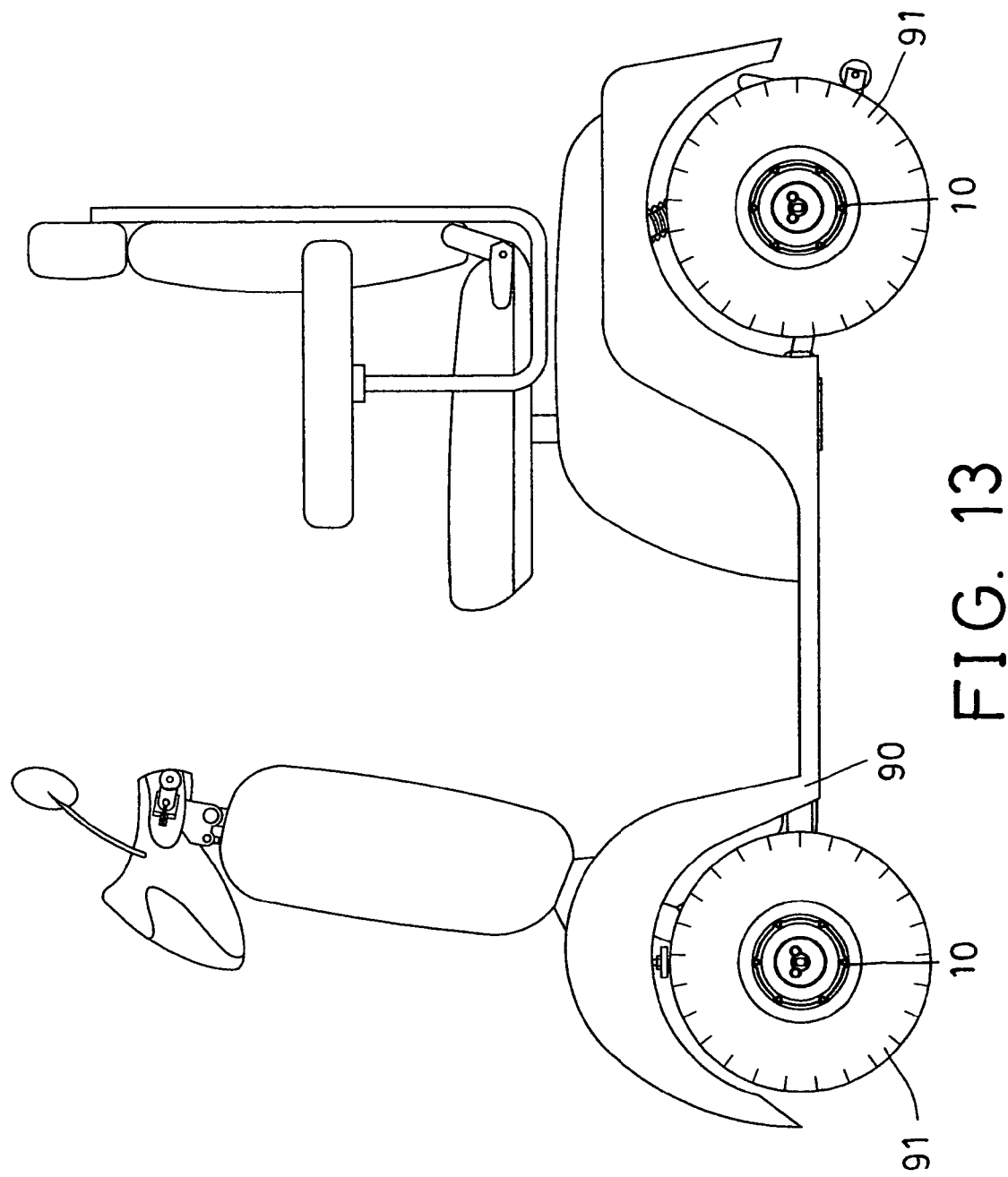
Figure 14:
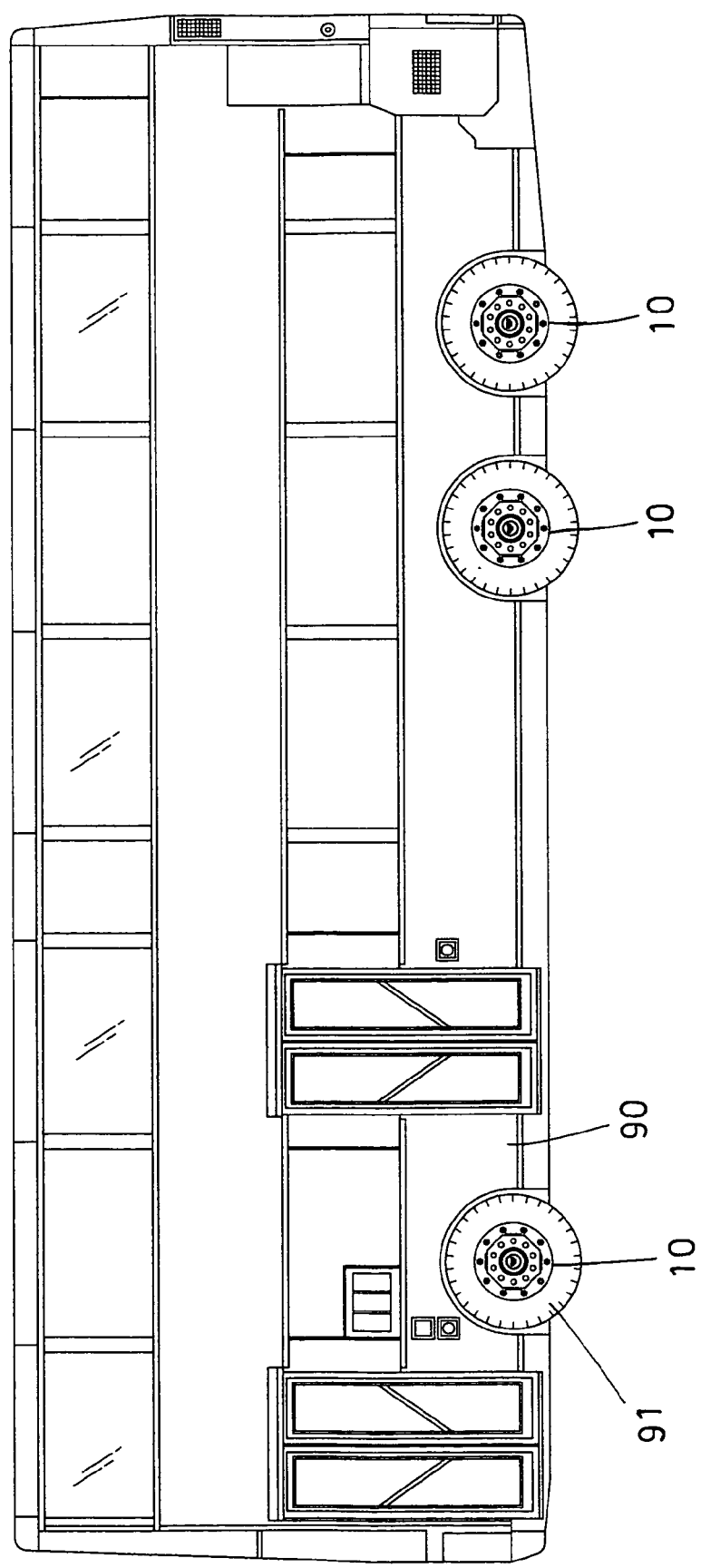
Figure 15:
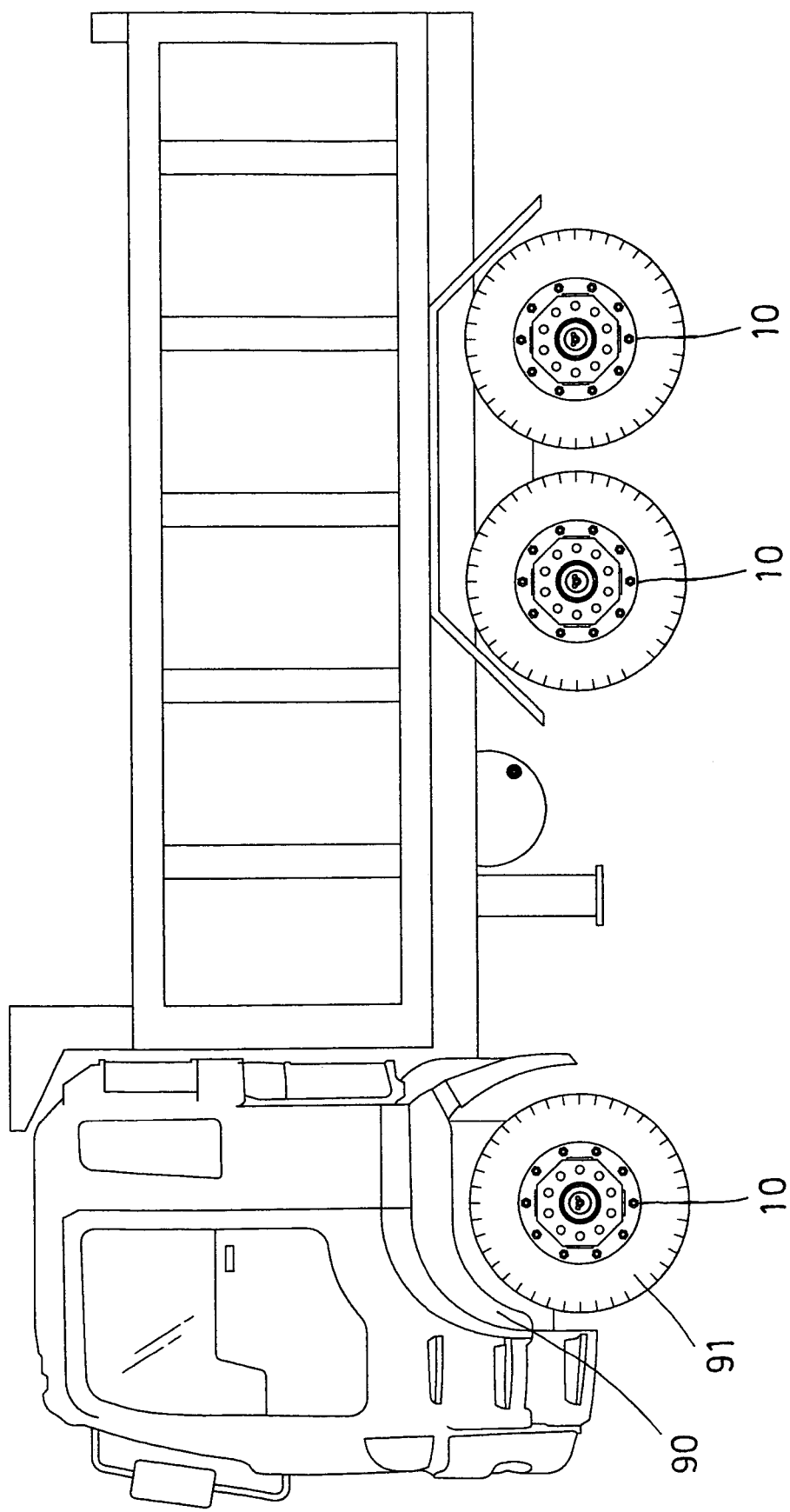
Figure 16:
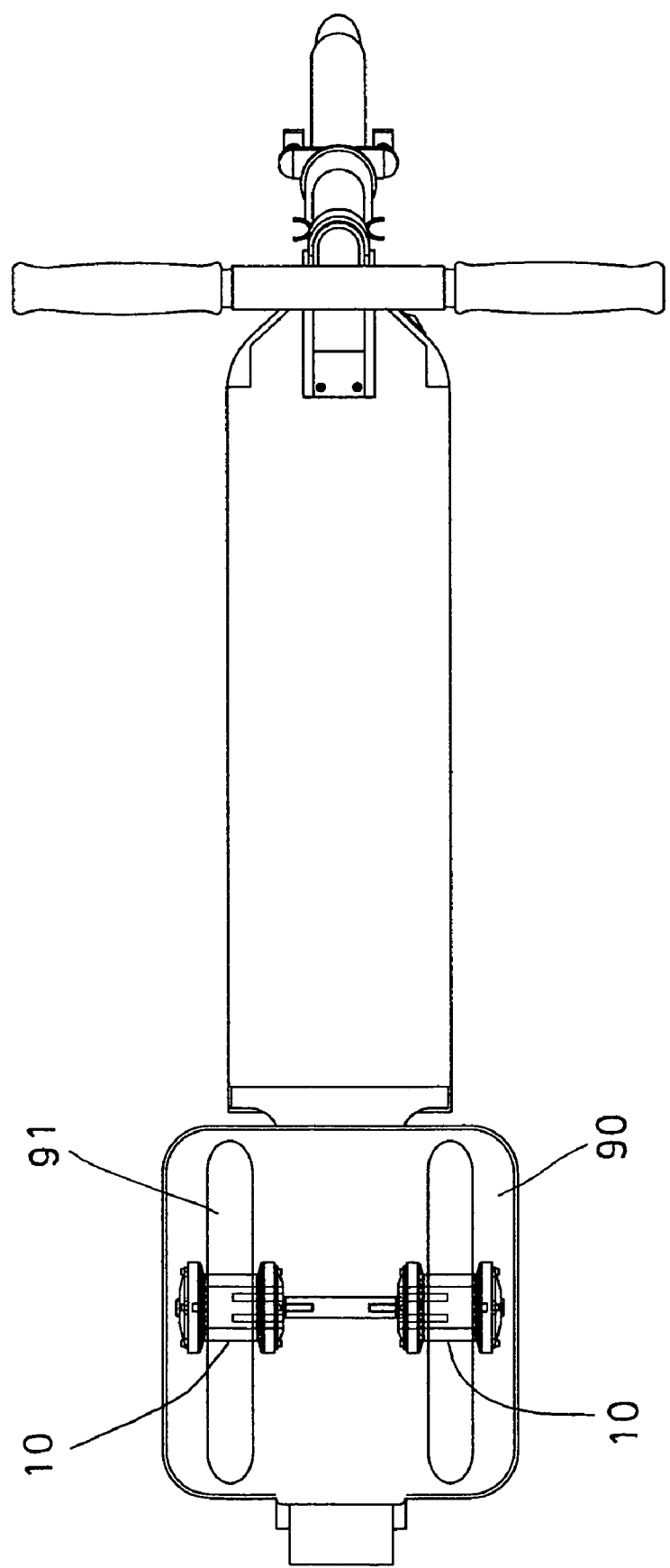
FIG. 16 is a top plan view of a scooter having a wheel hub driving mechanism attached thereto.
Figure 17:
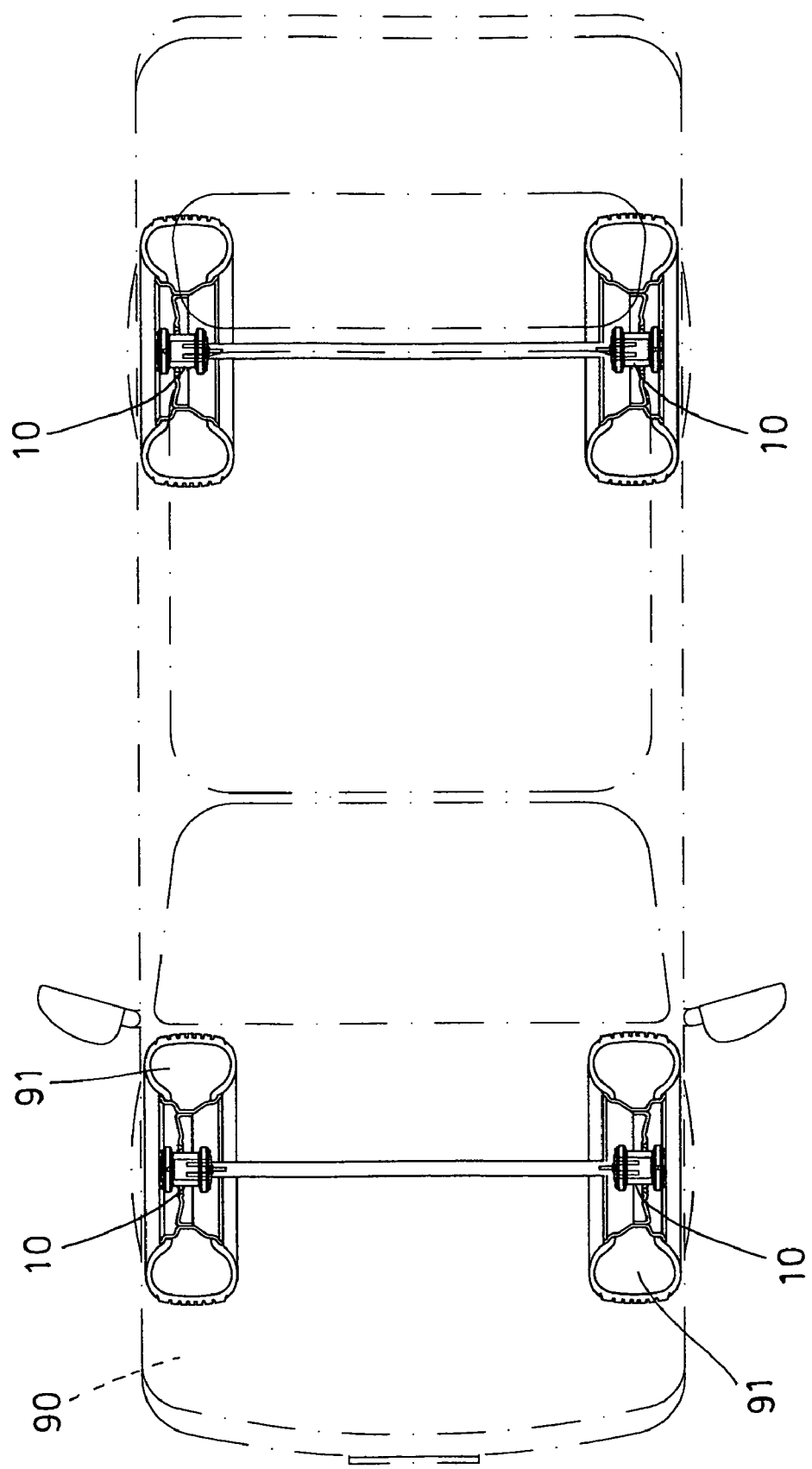

For example, as shown in FIG. 10, the vehicle may include a control facility 94 coupled to the inlet passage 47 of the hydraulic engine 40 via a hose 95 and a control valve 96, to pump or to force and to control the hydraulic oil or fluid to flow into the hydraulic engine 40, and to rotate or to drive the spindle 43 and the pinion 44 of the hydraulic engine 40. The hydraulic oil or fluid may then flow out of the hydraulic engine 40 via the outlet passage 48 of the hydraulic engine 40, and may then flow back to and may be collected within a reservoir 97, for being pumped to the hydraulic engines 40 again by the control facility 94.

One example of the hydraulic engine 40 has been disclosed in U.S. Pat. No. 6,736,099 to Mori et al which may be taken as a reference for the present invention. The hydraulic engine 40 may thus be actuated to rotate or to drive the spindle 43 and the pinion 44, in order to rotate or to drive the hub shell 11 relative to the hydraulic engine 40 and the plate 20 and the casing 30, which will be discussed hereinafter.

Referring again to FIGS. 2 and 5, a housing 50 is secured to the plate 20 with fasteners 51, and thus rotated in concert with the plate 20, and includes a projection 52 extended from one end thereof and rotatably attached or secured to the end cover 17 with a bearing 53, and includes a shaft 54 extended out through the end cover 17, for attaching or securing to the vehicle body 90. The plate 20 and the casing 30 and the hydraulic engine 40 and the housing 50 may thus be solidly secured to the vehicle body 90, and the hub shell 11 may thus be rotatably attached to or supported on the vehicle body 90 with the bearings 15, 39 and 53.

Figure 7:
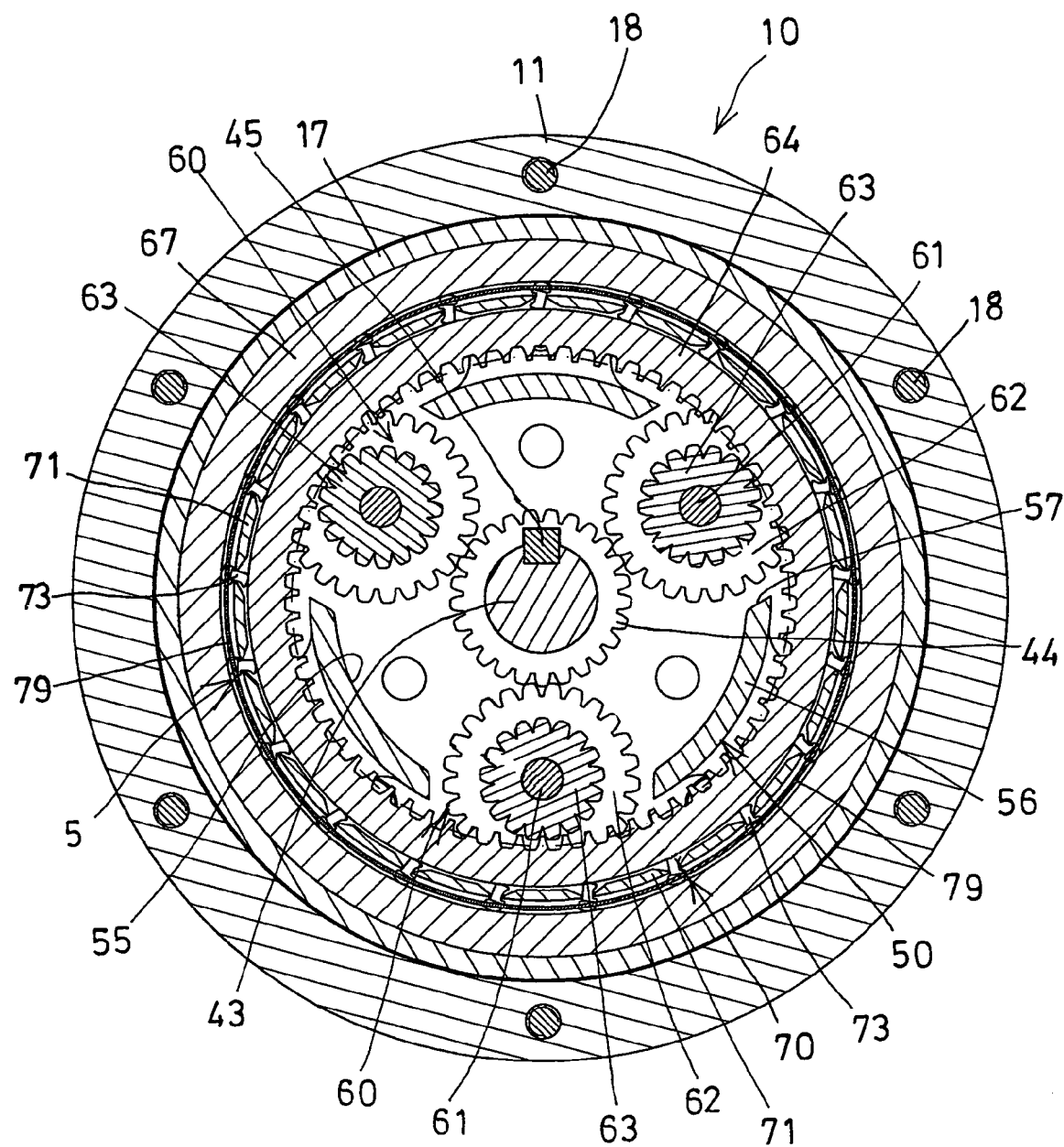

The housing 55 includes a chamber 55 formed therein (FIGS. 2, 5, 7), and defined by a peripheral wall 56 which includes three notches 57 formed therein. A reduction gearing 60 may be rotatably received in the chamber 55 of the housing 55, and includes three gears 62 rotatably secured to the housing 50 each with a pin 61, and engaged with the pinion 44 of the hydraulic engine 40, and each having a pinion 63 extended therefrom or formed integral with the gear 62 and rotated in concert with the gear 62. The pinions 63 are partially extended out through the notches 57 of the housing 55 (FIG. 7).

An annular gear 64 is rotatably disposed around the housing 50 and engaged with the pinions 63 of the reduction gearing 60, for allowing the annular gear 64 to be rotated or driven relative to the housing 50 by the hydraulic engine 40 via the reduction gearing 60. The end cover 17 or the hub shell 11 may include a barrel 67 attached or secured thereto and made of stronger materials, such as steel or the like. For example, the barrel 67 includes one or more extensions 68 extended therefrom and engaged or secured into the cavities 19 of the end cover 17, to solidly secure the barrel 67 to the end cover 17 and thus to the hub shell 11.

A directional control device 70 is disposed between the annular gear 64 and the barrel 67 or the end cover 17 or the hub shell 11 (FIGS. 2, 5, 7), and preferably disposed between the outer surface 65 of the annular gear 64 and the inner surface 69 of the barrel 67 (FIG. 2), in order to control the rotational movements between the annular gear 64 and the barrel 67, and thus between the end cover 17 and the hub shell 11 and the housing 50 and the hydraulic engine 40.

Figures 8, 9:
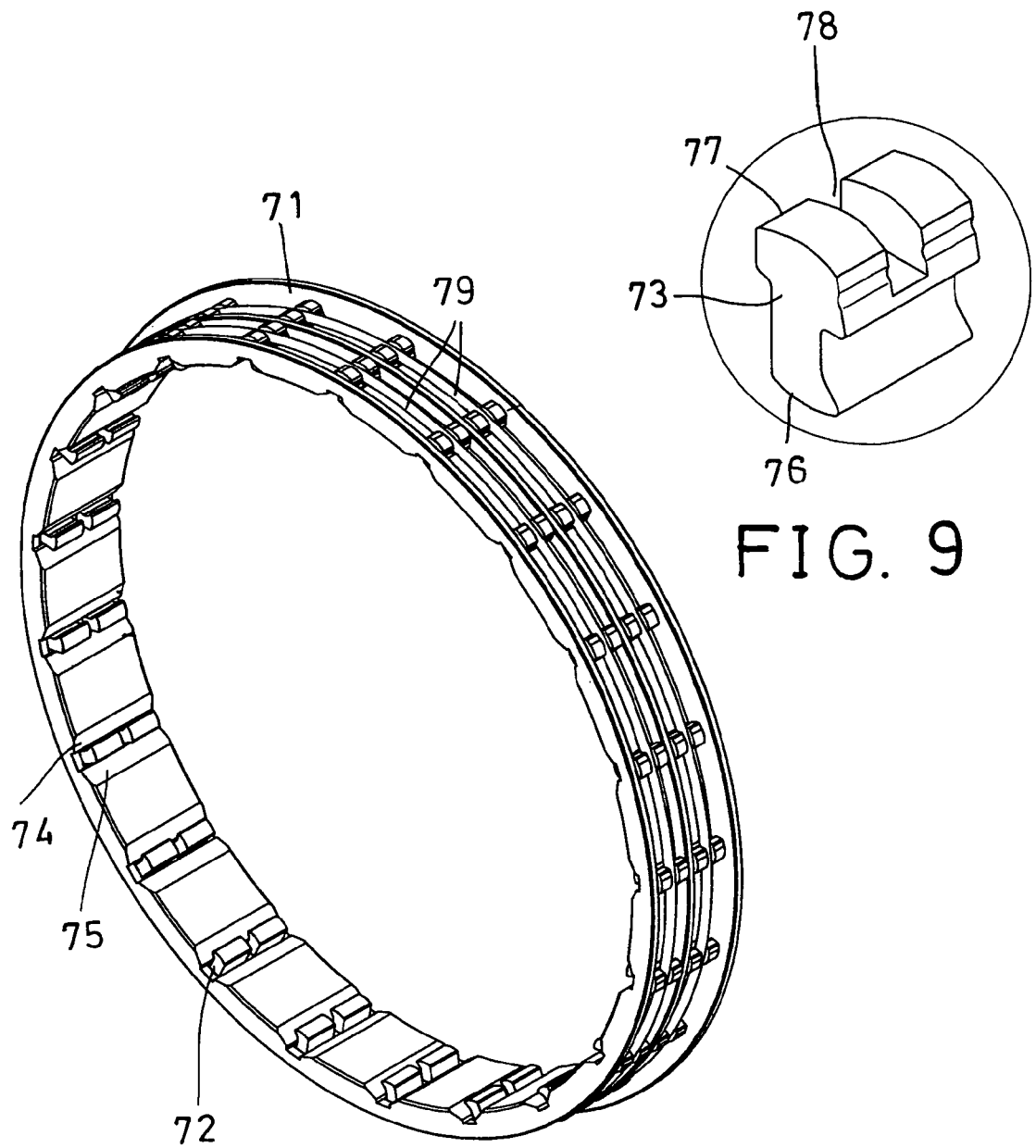
FIG. 8 is an enlarged perspective view illustrating a ring member for a directional control device of the wheel hub.
FIG. 9 is an enlarged perspective view illustrating a ratchet member for the directional control device of the wheel hub.

The directional control device 70 includes a ring member 71 (FIGS. 2, 8) disposed between the annular gear 64 and the barrel 67, and includes a number of apertures 72 formed therein for receiving one or more rows of pawls 73 therein. The pawls 73 are extended through the apertures 72 of the ring member 71, and include two ends 76, 77 engageable with the inner surface 69 of the barrel 67 and the outer surface 65 of the annular gear 64 respectively, and each includes a groove 78 formed in the outer ends 77 thereof (FIG. 9), for receiving clamping or retaining rings 79 which may retain or secure the pawls 73 to the ring member 71.

The pawls 73 are arranged to allow the barrel 67 and thus the hub shell 11 to be rotated or driven by the hydraulic engine 40 via the annular gear 64 in one direction, but to allow the barrel 67 and thus the hub shell 11 to be rotated freely relative to the annular gear 64 in an opposite direction, such that the hub shell 11 and thus the wheel 91 may be rotated or driven by the hydraulic engine 40 unidirectionally. One example of the typical unidirectional control device has also been disclosed in U.S. Pat. No. 5,024,121 to Hsieh which may also be taken as a reference for the present invention.

The ring member 71 includes a number pairs of inclined surfaces 74, 75 formed in the inner peripheral portion thereof (FIG. 8), and disposed or arranged beside the apertures 72 thereof respectively, for allowing the pawls 73 to be inclined or tilted relative to the ring member 71 in both directions. The ring member 71 may be rotated or actuated relative to the barrel 67 or the annular gear 64, to allow the hub shell 11 and thus the wheel 91 to be selectively driven by the hydraulic engine 40 in either direction by rotating the ring member 71 relative to the barrel 67 or the annular gear 64, for example.

The housing 50 and/or the reduction gearing 60 and the annular gear 64 and the directional control device 70 may thus be formed as a coupling device 5 (FIG. 2) and to be coupled between the hydraulic engine 40 and the hub shell 11, or may be used to connect the hydraulic engine 40 to the hub shell 11, to allow the hub shell 11 and thus the wheel 91 to be rotated or driven by the hydraulic engine 40 via the coupling device formed or defined by the reduction gearing 60 and/or the annular gear 64 and/or the directional control device 70.

In operation, as shown in FIGS. 5, 7, 19 and 20, when the spindle 43 and the pinion 44 are rotated or driven by the hydraulic engine 40, the annular gear 64 may also be rotated or driven by the hydraulic engine 40 via the reduction gearing 60, and the end cover 17 and the hub shell 11 and the wheel 91 may thus be controlled or driven by the annular gear 64 via the directional control device 70. As shown in FIGS. 10–18, the wheel hub in accordance with the present invention may be attached to various vehicles, to drive the vehicles directly without additional motors or engines.

Accordingly, the wheel hub in accordance with the present invention includes a hydraulic driving mechanism for driving wheels of cycles or vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A wheel hub for attaching to a vehicle, said wheel hub comprising:
   a hub shell including a chamber formed therein, and including a plate and a casing rotatably received in said chamber thereof,
   a hydraulic engine received in said chamber of said hub shell, and for attaching to the vehicle, and for allowing said hub shell to be rotated relative to said hydraulic engine and the vehicle, and said hydraulic engine including a rotatable spindle extended therefrom, and said hydraulic engine being attached between said plate and said casing to rotatably support said hub shell on said hydraulic engine and said plate and said casing,
   a coupling device coupled between said spindle of said hydraulic engine and said hub shell, to allow said hub shell to be driven by said hydraulic engine, and
   at least one fastener securing said plate and said casing together, to stably retain said hydraulic engine between said plate and said casing.

2. The wheel hub as claimed in claim 1, wherein said casing includes a space formed therein to receive a first end of said hydraulic engine, and to anchor said hydraulic engine to said casing.

3. The wheel hub as claimed in claim 2, wherein said hydraulic engine includes at least one recess formed in said first end thereof, said casing includes at least one jut extended into said space thereof, and engaged into said at least one recess of said hydraulic engine, to stably anchor said hydraulic engine to said casing.

4. The wheel hub as claimed in claim 1, wherein said casing includes two openings formed therein, and said hydraulic engine includes two passages formed therein and aligned with said openings of said casing, for allowing hydraulic fluid to flow into and out of said hydraulic engine.

5. The wheel hub as claimed in claim 1, wherein said coupling device includes a housing secured to said plate and having a chamber formed therein, an annular gear rotatably disposed around said housing, a pinion attached to said spindle, and a gearing engaged between said pinion and said annular gear, to allow said annular gear to be driven relative to said housing by said hydraulic engine via said gearing and said pinion.

6. The wheel hub as claimed in claim 5, wherein said housing includes three notches formed therein, said gearing includes three gears rotatably secured to said housing and engaged with said pinion, and each having a second pinion provided thereon and partially extended out through said notches of said housing respectively, and engaged with said annular gear.

7. The wheel hub as claimed in claim 5, wherein said coupling device includes a directional control device disposed between said housing and said hub shell, to control rotational movements between said annular gear and said hub shell.

8. The wheel hub as claimed in claim 7, wherein said hub shell includes an end cover secured thereto, a barrel attached to said end cover and rotated in concert with said end cover, said directional control device includes a ring member disposed between said annular gear and said barrel and having a plurality of apertures formed therein, and a plurality of pawls disposed through said apertures of said ring member and engaged between said annular gear and said barrel, to control the rotational movements between said annular gear and said hub shell.

9. The wheel hub as claimed in claim 8, wherein said end cover includes a plurality of cavities formed therein, said barrel includes a plurality of extensions extended therefrom and engaged into said cavities of said end cover, to secure said barrel to said end cover.

10. The wheel hub as claimed in claim 8, wherein said directional control device includes a retaining ring engaged with said pawls, to retain said pawls to said ring member.

11. The wheel hub as claimed in claim 10, wherein said pawls each includes a groove formed in outer portion thereof, to receive said retaining ring, and to retain said pawls to said ring member.

12. The wheel hub as claimed in claim 8, wherein said ring member includes a plurality pairs of inclined surfaces formed therein and arranged beside said apertures thereof respectively, for allowing said pawls to be tilted relative to said ring member.

* * * * *